United States Patent [19]

Gijsman et al.

[11] Patent Number: 5,286,785
[45] Date of Patent: Feb. 15, 1994

[54] THERMOSTABLE ETHYLENE-CARBON MONOXIDE COPOLYMER CONTAINING AL-MG-CO$_3$ OR CAO

[75] Inventors: Pieter Gijsman, Beek; Daniël J. M. Tummers, Geleen, both of Netherlands

[73] Assignee: DSM N.V., Heerlen, Netherlands

[21] Appl. No.: 904,490

[22] Filed: Jun. 25, 1992

[30] Foreign Application Priority Data

Jun. 25, 1991 [BE] Belgium ................................ 9100609

[51] Int. Cl.$^5$ .............................................. C08L 73/00
[52] U.S. Cl. ...................................... 524/612; 524/99; 524/252; 524/351; 524/352; 524/401; 524/425; 524/433; 524/436
[58] Field of Search ............... 524/612, 401, 425, 433, 524/252, 436, 351, 99, 352

[56] References Cited

U.S. PATENT DOCUMENTS

| 4,761,448 | 8/1988 | Kluttz et al. | 524/612 |
| 4,795,774 | 1/1989 | Klutz | 524/246 |
| 4,822,871 | 4/1989 | Klingensmith | 528/392 |
| 4,851,470 | 7/1989 | George | 524/612 |
| 4,857,570 | 8/1989 | Smutny | 524/112 |
| 4,868,282 | 9/1989 | Van Broekhoven et al. | 528/392 |
| 4,880,903 | 11/1989 | Van Broekhoven et al. | 528/392 |
| 4,885,328 | 12/1989 | Danforth et al. | 524/612 |
| 4,960,807 | 10/1990 | Smutny | 524/147 |
| 4,994,513 | 2/1991 | Syrier et al. | 524/210 |
| 5,006,638 | 4/1991 | Klutz | 528/483 |

FOREIGN PATENT DOCUMENTS

| 0121965 | 10/1984 | European Pat. Off. |
| 0313170 | 4/1989 | European Pat. Off. |
| 0326223 | 8/1989 | European Pat. Off. |

*Primary Examiner*—Harold D. Anderson
*Attorney, Agent, or Firm*—Cushman, Darby & Cushman

[57] ABSTRACT

Ethylene-carbon monoxide copolymer composition with improved thermal stability wherein the insoluble copolymer content after exposure to a temperature of 265° C. during 5 minutes is at most 40 wt. % and use of the composition for the manufacture of objects, essentially consisting of ethylene-carbon monoxide copolymer. The composition preferably contains an inorganic compound reacting as a base upon contact with water.

12 Claims, No Drawings

THERMOSTABLE ETHYLENE-CARBON MONOXIDE COPOLYMER CONTAINING AL-MG-CO₃ OR CAO

The invention relates to an ethylene-carbon monoxide copolymer composition having improved thermal stability.

The drawback of an ethylene-carbon monoxide copolymer is that it is readily crosslinked when subjected to temperatures close to, and in particular above, its melting point. As a result this copolymer loses its flow properties, so that it can no longer be processed using the customary techniques for melt processing of polymers, such as extrusion or injection moulding. Upon continued exposure to said temperatures, discolouration and degradation of the polymer takes place.

From EP-A-326 223 it is known to add 0.03-3.0 wt. % of a sterically hindered phenolic compound or a blend of for example an alkyl ester and an aromatic amine. From U.S. Pat. No. 4,857,570 it is known to add a succinic anhydride compound to an ethylene-carbon monoxide copolymer in order to enhance the thermal stability. A specific type of aromatic amines is known as a thermal stabilizer for an ethylene-carbon monoxide copolymer from U.S. Pat. No. 4,795,774. Although enhancements of the thermal stability of the copolymer are reported in these references it has appeared that in these state-of-the-art copolymer compositions obtained on exposure to a temperature above the melting point the copolymer still undergoes serious crosslinking and suffers from a considerable loss of melt processability despite the presence of the known stabilizers.

The object of the invention is to provide an ethylene-carbon monoxide copolymer with improved thermal stability, manifested in a lower degree of crosslinking upon exposure to temperatures above its melting point and consequently an improved melt processability in comparison with the state-of-the-art copolymer compositions.

There has been found now an ethylene-carbon monoxide copolymer composition wherein the insoluble copolymer content after exposure to a temperature of 265° C. during 5 minutes is at most 40 wt. % and even at most 30 wt. %, even at most 20 wt. %. In a preferred embodiment the copolymer composition according to the invention contains 0.05-2 wt. % and preferably 0.2-1 wt. % of one or more inorganic compounds reacting as a base upon contact with water.

In U.S. Pat. No. 4,960,807 it is taught to add a mixture of ZnO, ZnS and a trialkylphosphite to an ethylene-carbon monoxide copolymer to stabilize it against undue loss of crystallinity. The presence of the phosphite beside the ZnO is indispensable and for improvement of the thermal stability other components are said to be necessary. A possible thermally stabilizing effect of ZnO is cannot be learned from this reference.

From U.S. Pat. No. 4,885,328 and EP-A-313,170 the addition to ethylene-carbon monoxide copolymers of alkaline earth metal hydroxides and carbonates in a flame retardant quantity is known. Such a flame retardant quantity according to the descriptions is at least 2% and in the Examples no less than 5 wt. % with respect to the copolymer is applied. The insight that inorganic compounds, reacting as a base on contact with water, in amounts of 0.05 to less than 2 and even less than 1 wt. % are surprisingly effective for improving the thermal stability of the said copolymers by preventing their crosslinking at temperatures above their melting points is totally absent in these references.

It has been found that the copolymer in the composition according to the invention exhibits only a very low degree of crosslinking after exposure to temperatures near or above its melting point.

A further advantage of the copolymer composition according to the invention in the preferred embodiment is that the inorganic substances added as thermal stabilizer are generally not toxic, contrary to other known thermal stabilizers, so that their presence in the copolymer according to the invention does not give rise to major constraints on its possible applications, for instance in containers and packaging film for foodstuffs.

It has been found that the presence in an ethylene-carbon monoxide copolymer, further referred to as CO copolymer, of an organic compound reacting as a base upon contact with water does not significantly improve the thermal stability of the copolymer.

The addition of said inorganic compounds to polymers other than CO polymer is known in itself, for instance for polyvinyl chloride (PVC), but in that case the compounds serve to bind acid that has been split off. However, an ethylene-carbon monoxide copolymer is an entirely different type of polymer from PVC and here no acid is split off. In polymers that are related to the copolymer, such as polyethylene and polypropylene, the addition of inorganic compounds reacting as a base upon contact with water does not effect any improvement of the thermal stability. Conversely, the substances customarily acting as thermal stabilizers for polyolefins such as polyethylene and polypropylene do not appear to have this effect upon addition to an ethylene-carbon monoxide copolymer. What has been found, though, is that addition of these known substances, in themselves inactive as thermal stabilizer for CO copolymer, surprisingly produces a further improvement of the thermal stability. Here, therefore, a synergetic effect is present. This effect is in particular present if the said known substance is a phenolic antioxidant, preferably comprising at least one substituted phenolic ring. Such a ring is preferably substituted at the 2-, the 4- and the 6-position, more preferably at least at one of the 2- and 6-position with a tertiary butyl group.

An ethylene-carbon monoxide copolymer is understood to be an alternating copolymer of carbon monoxide and ethylene, or of carbon monoxide and ethylene and additionally one or more other olefinically unsaturated monomers. Such an alternating copolymer is composed of, alternately, a unit originating from an olefinically unsaturated monomer unit and a carbon monoxide unit. The proportion of either of the components is therefore 50 mol %, which at the same time is the maximum possible proportion of the CO units in such a copolymer. In the framework of the invention reference is made to an alternating copolymer also when the copolymer comprises at least 48 mol % of CO units. CO copolymers in which, besides carbon monoxide, only ethylene has been copolymerized have a higher melting point than those in which other olefinically unsaturated monomers or mixtures are present, and therefore they are preferred for high-temperature applications of products made from the CO polymer. Methods for the preparation of CO copolymers are known in themselves, for instance from EP-A-121.965 and from EP-A-213.671.

The CO polymer in the preferred embodiment according to the invention contains 0.05-2 wt. %, and preferably 0.2-1 wt. % of an inorganic compound reacting as a base upon contact with water. It is very difficult to effect homogeneous distribution of amounts lower than 0.05 wt. %, and such amounts will yield only an unsatisfactory improvement of the thermal stability, while the addition of larger amounts proves less effective and, moreover, entails the risk of other properties of the copolymer in the end product being adversely affected. Preferably, the inorganic compound contains an oxide, hydroxide or carbonate of at least one metal from Group I or from Group II of the periodic system, and more preferably the inorganic compound is chosen from the group formed by aluminium-magnesium carbonates and calcium oxide.

The invention also relates to the use of the ethylene-carbon monoxide copolymer composition according to the invention in the manufacture, preferably by melt processing of the composition, of objects essentially consisting of the composition. Moreover the invention relates to the use of an inorganic compound, which reacts as a base on contact with water, for the enhancement of the thermal stability of an ethylene-carbon monoxide copolymer.

The invention will be elucidated on the basis of the following examples, without, however, being restricted thereto.

The CO polymers used in the examples are alternating copolymers of carbon monoxide and ethylene in which the content of each of the components is 50 mol %, or terpolymers of carbon monoxide and ethylene with as third component propylene or octene, in which the carbon monoxide content is 50 mol %. These CO copolymers were synthesized by the process disclosed in EP-A-213 671.

Table 1, below, lists the additives examined for their improving effect on the thermal stability of CO copolymer.

TABLE 1 a) Inorganic compounds reacting as a base upon contact with water
   Synthetic hydrotalcite, a magnesium-aluminium carbonate (DHT4A ® from Kyowa Chemical Industry Co. Ltd, JP)
   Calcium oxide
   Calcium hydroxide
   Sodium carbonate b) Organic compounds reacting as a base upon contact with water
   Triethylene diamine (DABCO)
   Permanax DPPD ® (Vulnax International Ltd, GB)
   Di(methyl-piperidyl)sebacate (Tinuvin 770 ® from Ciba-Geigy, CH)

c) Known thermal stabilizers for polyolefins
   Irganox 1010 ®
   Irganox B225 ®
   Irganox PS802 ® (all from Ciba-Geigy, CH)
   Di-tertiary butyl paracresol (BHT).

The additives examined for their thermostabilizing effect are added to the polymer by moistening the latter with a solution or suspension of the additive followed by vacuum evaporation of the solvent or suspension agent. Of the resulting powder samples are moulded in the form of tablets, which are wrapped in aluminium foil and placed in an air circulating oven, where they are exposed to a temperature of 265° C. during 5 minutes. As can be read from Table 2 in Comparative Experiment A, this temperature is above the melting point of the CO copolymers used. After this heat treatment the degree of crosslinking in the samples is determined. As a measure of the degree of crosslinking, the size of the insoluble fraction of the copolymer is determined by extracting a sample of the copolymer during 20 hours at 100° C. using m-cresol. To remove the m-cresol the remaining copolymer is washed with methanol and dried. The content, in wt. %, of copolymer that has been crosslinked, making it insoluble in m-cresol, is determined from the weight of the heat-treated copolymer before extraction and after drying.

The intrinsic viscosity (IV) of the CO copolymer is determined in m-cresol at 100° C.

COMPARATIVE EXAMPLE A

Using the process of EP-A-213.671, four CO ethylene copolymers are synthesized. The CO content in all cases is 50 mol %. In the manner described above, samples of the four copolymers are subjected to a heat treatment and the content of crosslinked, insoluble copolymer is determined. The results of this determination and other relevant data on the copolymers are presented in Table 2.

TABLE 2

| Polymer | Composition | | | IV dl/g | Melting temperature °C. | Insoluble fraction wt. % |
|---|---|---|---|---|---|---|
| | ethylene mol % | propylene mol % | octene mol % | | | |
| A | 50 | 0 | 0 | 1.27 | 253 | 100 |
| B | 49.7 | 0.3 | 0 | 1.08 | 230 | 100 |
| C | 49.4 | 0 | 0.6 | 1.04 | 245 | 84 |
| D | 49.8 | 0.2 | 0 | 1.6 | 237 | 100 |

EXAMPLE I

The thermal stability of the compositions according to the invention is examined by subjecting the compositions to a heat treatment and then determining the fraction of insoluble polymer, as described above. The amount of additive in all cases is 0.5 wt. %. The results are presented in Table 3.

TABLE 3

| Polymer | Additive | Insoluble fraction wt. % |
|---|---|---|
| A | DHT4A | 20 |
| B | DHT4A | 30 |
| C | DHT4A | 41 |
| C | CaO | 24 |
| D | DHT4A | 12 |
| D | Ca(OH)$_2$ | 48 |
| D | Na$_2$CO$_3$ | 40 |

In all cases, the CO polymer to which a compound reacting as a base had been added is found to have significantly lower crosslinking upon exposure to a temperature above the melting point than the copolymer without additive.

EXAMPLE II

The effect on the CO copolymers of the amount of additive is examined by adding different amounts of DHT4A to polymer D. The results are presented in Table 4.

TABLE 4

| Amount of DHT4A, wt. % | Insoluble fraction, wt. % |
|---|---|
| 0 | 85 |

TABLE 4-continued

| Amount of DHT4A, wt. % | Insoluble fraction, wt. % |
|---|---|
| 0.1 | 12 |
| 0.5 | 12 |
| 2.0 | 39 |
| 5.0 | 45 |
| 8.0 | 60 |

These results prove that the thermal stability is considerably improved through addition of amounts of additive from 0.1 wt. % DHT4A upwards, but after addition of 8 wt. % additive again more than half of the copolymer is crosslinked during a heat treatment.

COMPARATIVE EXAMPLE B

The thermal stability is examined of CO copolymer to which organic compounds reacting as a base have been added. This is done by adding each of the substances specified under b. in Table 1 to polymer C from Experiment I, in each case in an amount of 0.5 wt. %. The results are presented in Table 5.

TABLE 5

| Additive | Insoluble fraction, wt. % |
|---|---|
| None | 84 |
| DABCO | 83 |
| Tinuvin 770 | 80 |
| Permanax DPPD | 100 |

The presence of organic compounds reacting as a base gives hardly any improvement, and in some cases even a deterioration, of the thermal stability of the CO copolymer.

COMPARATIVE EXAMPLE C

The activity in CO copolymer of customary thermal stabilizers, known for polyolefins, is examined. To this end, each of the substances specified under c. in Table 1 is added to copolymers A and B from Experiment I, in each case in an amount of 0.5 wt. %. The results are presented in Table 6.

TABLE 6

| Polymer | Additive | Insoluble fraction, wt. % |
|---|---|---|
| A | Irganox 1010 | 100 |
| A | Irganox B225 | 100 |
| B | Irganox PS802 | 100 |
| B | BHT | 100 |

The presence of customary thermal stabilizers, known for polyolefins, does not result in improvement of the thermal stability of the CO polymers.

EXAMPLE III

The effect is examined of the presence in the CO polymer according to the invention of substances that in themselves are not active as thermal stabilizers. To this end, besides 0.5 wt. % DHT4A 0.5 wt. % Irganox 1010 was added to copolymer B. The results are presented in Table 7.

TABLE 7

| Additive | Insoluble fraction, wt. % |
|---|---|
| None | 100 |
| Irganox 1010 | 100 |

TABLE 7-continued

| Additive | Insoluble fraction, wt. % |
|---|---|
| DHT4A | 30 |
| DHT4A + Irganox 1010 | 18 |

The addition of Irganox 1010, in itself inactive as a thermal stabilizer, to CO copolymer already thermally stabilized with DHT4A, appears to yield a clear improvement of the thermal stability. The content of insoluble copolymer decreases from 30 to 18 wt. %.

COMPARATIVE EXPERIMENTS D-F

In order to investigate the preventive effect on crosslinking of ethylene-carbon monoxide copolymers of compounds, known to have certain thermally stabilizing effects on ethylene-carbon monoxide copolymers the procedure described in the introduction to the experimental section is repeated using compounds already known for this purpose. These compounds are:
- succinic anhyride, known from U.S. Pat. No. 4,857,570 (Comparative Experiment D),
- a mixture of compound (1) of Example 2 of EP-A-326,223 and as an aromatic amine Permanax DPPD, which is a diphenylamine (Comparative Experiment E), and
- Permanax DPPD, known as N,N'-diphenyl-p-phenylenediamine from Table I, U.S. Pat. No. 4,795,774 (Comparative Experiment F).

The results are given in Table 8.

TABLE 8

| Comp. Exp. | Polymer wt. % | Insoluble fraction |
|---|---|---|
| D | B | 91 |
| E | B | 100 |
| F | C | 100 |

The known thermal stabilizers apparently do not or insufficiently prevent the copolymers from crosslinking at temperatures above their melting point.

We claim:

1. Ethylene-carbon monoxide copolymer composition containing 0.05-2 wt. %, calculated relative to the copolymer, of an inorganic compound reacting as a base upon contact with water, excluding ZnO, and additionally comprising a phenolic anti-oxidant.

2. Ethylene-carbon monoxide copolymer composition according to claim 1, containing 0.2-1 wt. % of said inorganic compound.

3. Ethylene-carbon monoxide copolymer composition according to claim 1, in which the inorganic compound contains at least one metal from Group I or Group II of the periodic system.

4. Ethylene-carbon monoxide copolymer composition according to claim 1, in which the inorganic compound comprises an oxide, an hydroxide or a carbonate.

5. Ethylene-carbon monoxide copolymer composition according to claim 1, wherein the phenolic antioxidant comprises at least one substituted phenolic ring.

6. Ethylene-carbon monoxide copolymer composition according to claim 4, wherein the phenolic ring is substituted at the 2- the 4- and the 6-position.

7. Ethylene-carbon monoxide copolymer composition according to claim 6, wherein at least one of the substituents at the 2- and the 6-position of the phenolic ring is a tertiary butyl group.

8. Ethylene-carbon monoxide copolymer composition containing 0.05–2 wt. %, calculated relative to the copolymer, of an inorganic compound selected from the group consisting of aluminum-magnesium carbonates and calcium oxide.

9. Ethylene-carbon monoxide copolymer composition according to claim 8, additionally comprising a phenolic anti-oxidant.

10. Ethylene-carbon monoxide copolymer composition according to claim 9, wherein the phenolic anti-oxidant comprises at least one substituted phenolic ring.

11. Ethylene-carbon monoxide copolymer composition according to claim 10, wherein the phenolic ring is substituted at the 2- the 4- and the 6-position.

12. Ethylene-carbon monoxide copolymer composition according to claim 11, wherein at least one of the substituents at the 2- and the 6-positions of the phenolic ring is a tertiary butyl group.

* * * * *